United States Patent
Jeng

(10) Patent No.: US 7,471,723 B2
(45) Date of Patent: Dec. 30, 2008

(54) ERROR CONCEALMENT AND ERROR RESILIENCE

(75) Inventor: Yi-Yung Jeng, San Jose, CA (US)

(73) Assignee: Sigmatel, Inc., Austin, TX (US)

( * ) Notice: Subject to any disclaimer, the term of this patent is extended or adjusted under 35 U.S.C. 154(b) by 604 days.

(21) Appl. No.: 10/438,298

(22) Filed: May 13, 2003

(65) Prior Publication Data

US 2004/0228402 A1    Nov. 18, 2004

(51) Int. Cl.
*H04N 7/12* (2006.01)
*H04N 11/02* (2006.01)
*H04N 11/04* (2006.01)
*H04B 1/66* (2006.01)

(52) U.S. Cl. .............................. 375/240.03

(58) Field of Classification Search ............ 375/240.03, 375/240.12–240.16, 240.18, 240.2, 240.23, 375/240.24, 240.27; 382/232; *H04N 7/12*
See application file for complete search history.

(56) References Cited

U.S. PATENT DOCUMENTS

| 6,493,392 | B1 * | 12/2002 | Chung et al. | 375/240.27 |
| 6,795,503 | B2 * | 9/2004 | Nakao et al. | 375/240.03 |
| 2003/0031261 | A1 * | 2/2003 | Valente et al. | 375/240.27 |
| 2005/0259875 | A1 * | 11/2005 | Imura et al. | 382/232 |

* cited by examiner

*Primary Examiner*—Nhon T Diep
(74) *Attorney, Agent, or Firm*—Toler Law Group

(57) ABSTRACT

A system and method of transmitting video packets to enhance error concealment and error resilience are provided. The method includes encoding a first macroblock of video data into a video packet. The method also includes determining whether a length of the video packet including the first macroblock exceeds a threshold length. The method also includes encoding a second macroblock into the video packet as the final macroblock when the length of the video packet with the first macrobock exceeds the threshold length. The method also includes transmitting the video packet.

12 Claims, 8 Drawing Sheets

ERROR CONCEALMENT AND ERROR RESILIENCE

BACKGROUND

1. Field of the Invention

The current invention is directed toward encoding of multimedia data and, in particular, to forming of MPEG-4 multimedia data packets.

2. Discussion of Related Art

There is great interest in developing techniques and standards for efficient transmission of multimedia data. One popular standard is MPEG-4. MPEG-4 is an ISO/IEC standard developed by the Motion Picture Expert Group (MPEG) and is used for both fixed and mobile users. MPEG-4 is designed to facilitate fast and efficient transmission of multimedia data. The MPEG-4 standard, also known as ISO/IEC 14496, supports object-based encoding of audio, text, image, and synthetic or natural video data, and includes algorithms for efficient transmission over non-ideal links. In general, the MPEG-4 multimedia standard applies well-known video compression techniques, which were developed from predecessor standards, namely MPEG-1 and MPEG-2. The standard includes a key feature of error resilience, thus making MPEG-4 suitable for applications that utilize error prone channels such as wireless links and the Internet infrastructure.

As shown in FIG. 1, a transceiver system 100 using MPEG-4 encoded data includes a transmitter 103 and a receiver 106. Transmitter 103 includes an MPEG-4 encoder 104 to encode data from one or more source devices, source devices 101 and 102 are shown, into the MPEG-4 format. The encoded data passes through a network 105 to receiver 106. Receiver 106 includes a MPEG-4 decoder 107 that decodes the received data and passes appropriate data to targeted destination devices, destination devices 108 and 109 are shown.

In accordance with the MPEG-4 standard, an object-based scene is built with individual objects with spatial and temporal relationships. Each of the individual objects can be natural (e.g., recorded video) or artificial (e.g., computer generated objects). The objects may be created in any number of ways, including from a user's video camera or an audio-visual recording device, or may be generated by a computer. Advantages to this approach include the ability to build morphed scenes, for example, with animated characters shown in natural scenes or natural characters in animated scenes. Further, splitting the scenes into individual objects can significantly reduce the number of bits required to transmit a completed audio-visual presentation.

With the current demand for access to complete audio-visual information over various network environments, particular attention is paid to methods of reducing the actual amount of digital data required to represent that information. It is expected that future demand for audio-visual data will match or exceed the current demand for networked textual and graphical data.

FIG. 2 shows the division and manipulation of frame data 200 from a stream of video images consisting of a sequence of video frames. A video frame 200 may be divided into a sequence of Macro Blocks (MBs) 201-1, 201-2, ..., 201-P, where each MB represents a group of, for example, 16 by 16 pixels. A sequence of MBs forms a Group of Blocks (GoB). In known implementations of MPEG-4 decoders, each GoB consists of a fixed number of MBs. During encoding, each GoB is compressed into a compressed video packet of data. For typical streams of video images, the resulting video packets, each packet representing a GoB, will have a variable number of bits. If compression is highly successful, the video packet will be very short in bit-length. On the other hand, if the data within the GoB is dynamic and complex, the video packet will be very long in bit-length. Thus, two GoBs, each containing the same number of MBs and therefore an identical number of unencoded bits, might result in two respective video packets having very different bit-lengths. In other words, equally sized regions of the video image may be represented by very different length video packets of data. Some video packets may be very short. Other video packets may be very long.

Once compressed into video packets, the GoB data is transmitted through a channel 105 to receiver 106 for eventual decoding. Channel 105, for example, a wireless network or the Internet, may be a noisy or error prone channel. Often, errors or bursts of errors are uniformly distributed; thus each bit has an equal probability of being detected erroneously by receiver 106 because of impairments in channel 105.

By definition longer video packets contain more bits than shorter video packets. Thus, longer video packets, on average, have a higher probability of being received with errors than shorter video packets. At some point, if a video packet contains too many errors, the errors cannot be corrected and the entire packet will be discarded. The receiver will then drop the current video packet and seek the beginning of the next transmitted packet.

The shorter video packets, on the other hand, have a lower probability of being received with errors. Each packet, however, has associated with it fixed overhead. Having video data divided into a large number of short video packets inefficiently uses the available channel bandwidth. The use of bandwidth for a large number of overhead bits (e.g., resync and header bits) of each video packet reduces the available bandwidth for video information and reduces the efficiency of channel 105.

As video messaging, video telephony and video conferencing become more prolific with the expansion of the Internet and wireless based networks, there will be a need for more efficient techniques of encoding video data in a way that reduces the impact of channel induced errors on video packets of data and that optimizes the use of available channel bandwidth.

SUMMARY

In accordance with the present invention, a video packet encoder is described. The video packet encoder serially encodes macroblocks of encoded video data into data transmission packets having substantially uniform length. By calculating the length of an encoded macroblock, a sequence of encoded macroblocks may be assembled into video packets of the target length. By generating video packets of approximately equal length, channel induced bit errors may be evenly distributed among the video packets and across the video frame.

A method of encoding macroblocks according to the present invention serially encoding macroblocks of encoded video data into packets includes encoding a macroblock of video data to form encoded macroblock data; and determining whether a second macroblock should be included in a video packet based on a comparison of a length of the video packet with the encoded macroblock data with a threshold length.

A macroblock encoder according to the present invention includes a discrete cosine transform that receives macroblocks of video data and outputs transformation data; a quantizer that quantizes the transformation data; an encoder that encodes the quantized transformation data; and a variable length coder that arranges the quantized transformation data by groups of macroblocks into video packets with roughly uniform lengths.

Other embodiments will be further discussed below with respect to the following figures.

SHORT DESCRIPTION OF THE FIGURES

Figure 8:
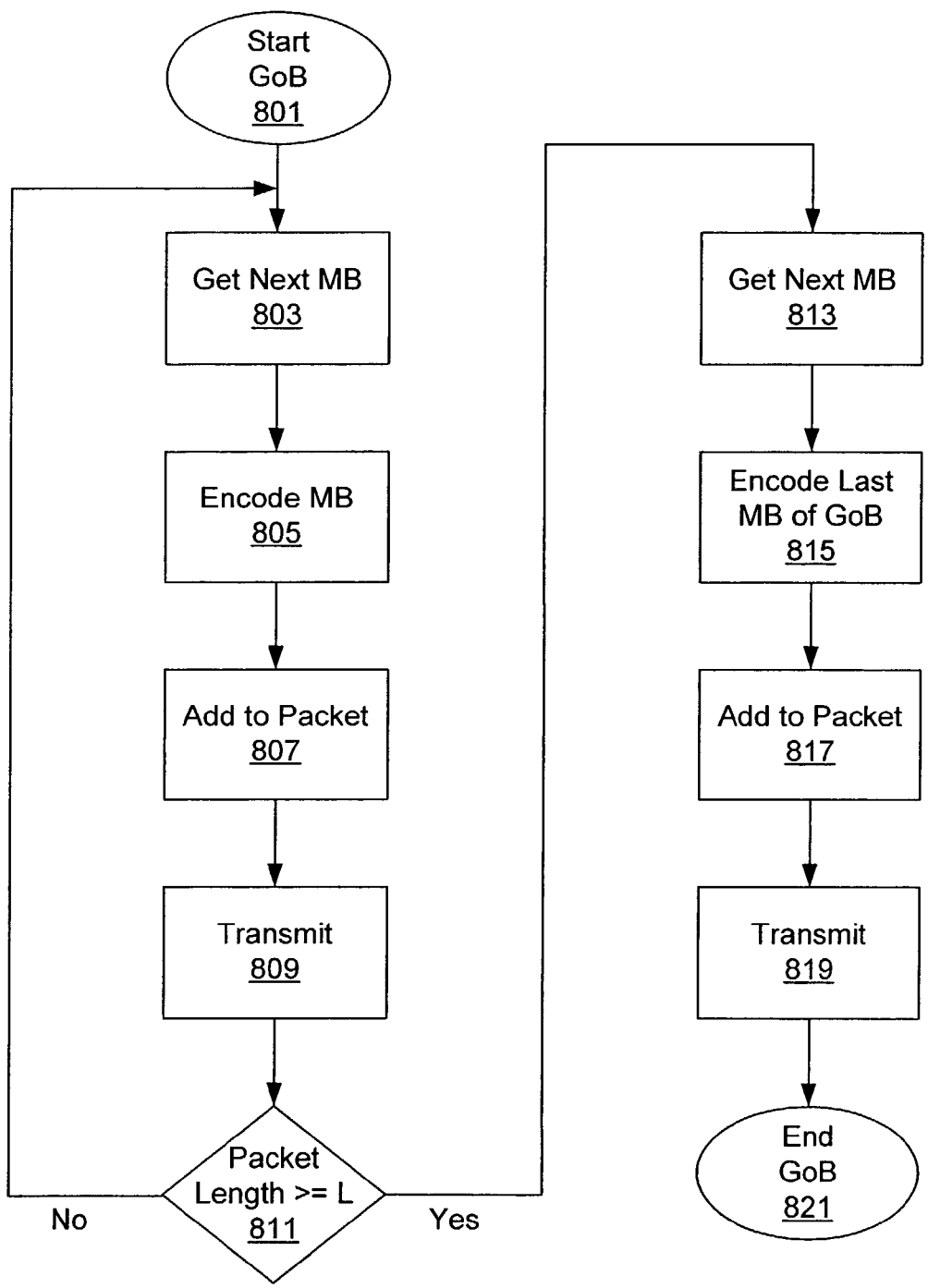

FIG. 8 presents a flow chart of a method to generate video packets having substantially uniform length according to the present invention.

Figure 9:
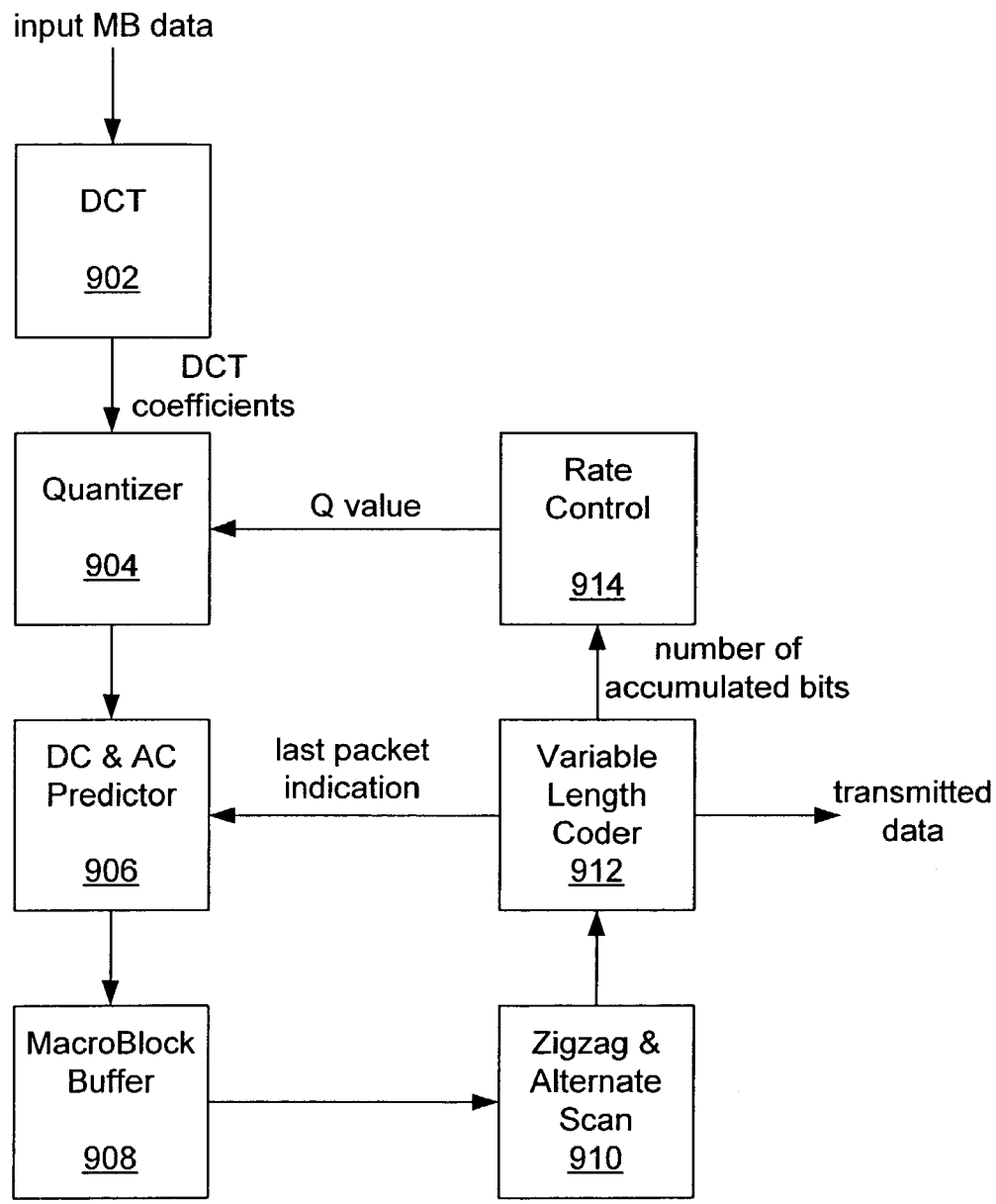

FIG. 9 shows a block diagram of a video packet encoder according to the present invention.

Figure 10:
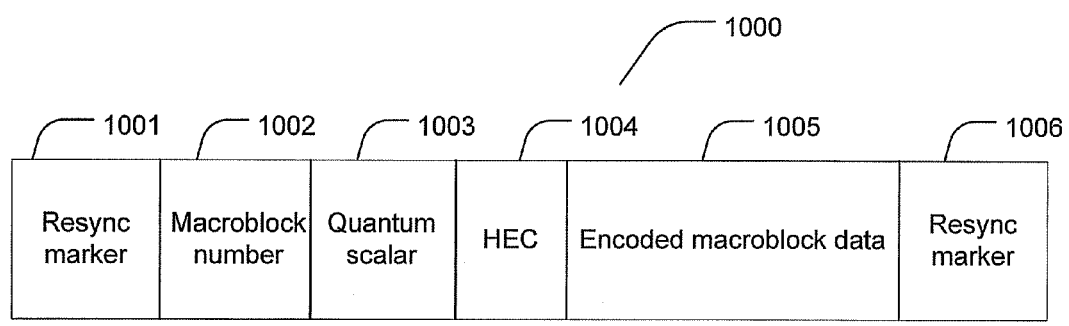

FIG. 10 shows the format of a video packet.

In the figures, elements having the same or similar function are assigned the same designation.

DETAILED DESCRIPTION

Figure 1:
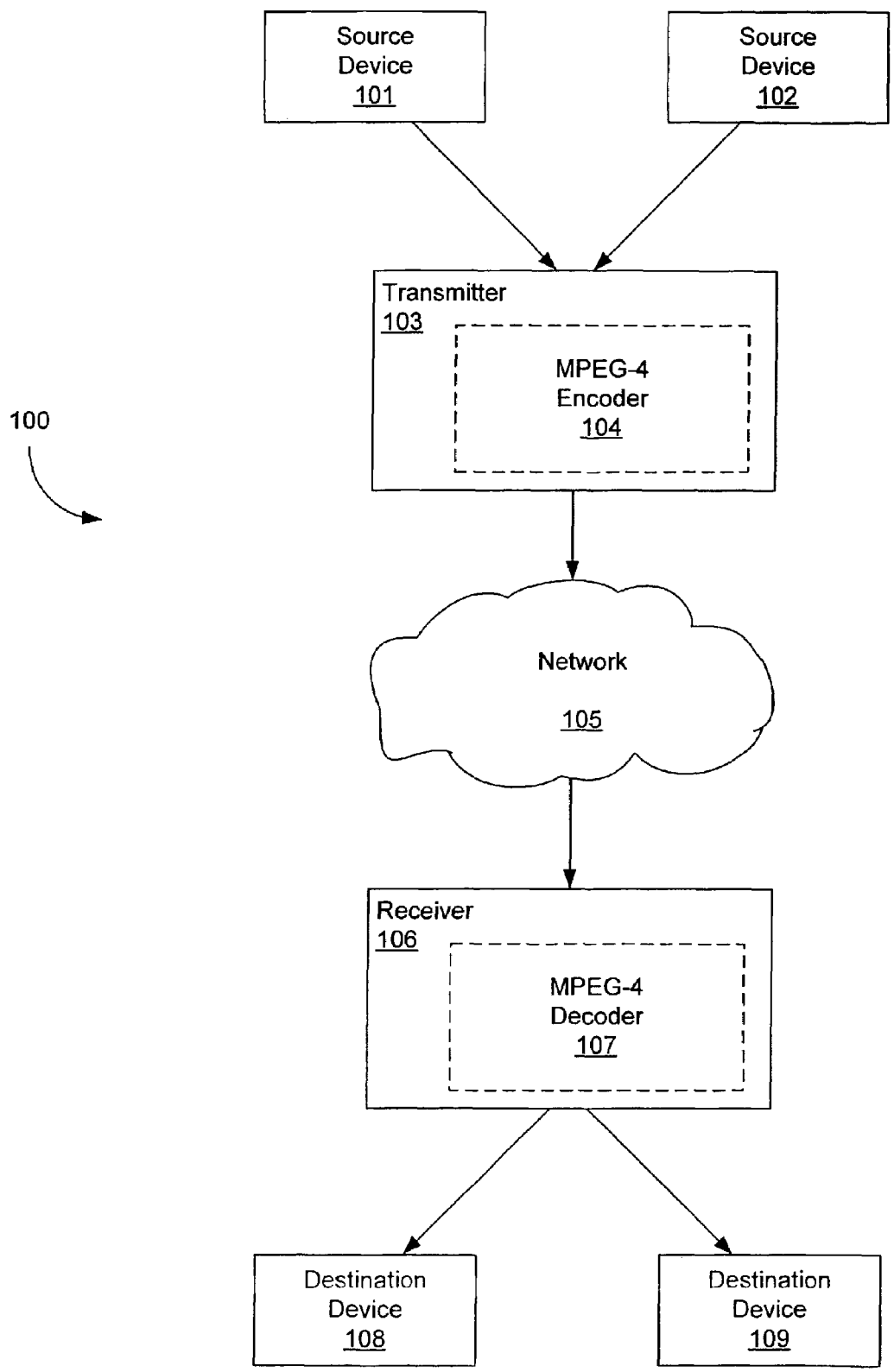
FIG. 1 illustrates an MPEG-4 transmitter and receiver system.

FIG. 1 shows a block diagram of an embodiment of a video transceiver system 100 according to the MPEG-4 (Moving Picture Experts Group) standard. The first version of the MPEG-4 standard was released in October of 1998 and became an international standard in November of 1999. The MPEG-4 standard is further described in the ISO/IEC document 14496-2 (hereinafter referred to as the "MPEG-4 standard"), herein incorporated by reference in its entirety.

The MPEG-4 standard is designed to support a wide range of multi-media applications, including transmission of computer generated or naturally generated video. Applications include telecommunications (e.g., video conferencing) as well as entertainment (e.g., movies, animation, combinations of animation and natural scenes, etc.). As part of the MPEG-4 standard, coding of multi-media material in order to reduce the bit-rate required to transmit high-quality multi-media is necessary in order to fulfill the bandwidth constraints of transport mechanisms such as wireless, internet, or recording media such as magnetic storage or optical storage disks. In accordance with the MPEG-4 standard, audio, video, images, graphics, and other multi-media components can be represented as separate objects and multiplexed to form a scene. Each of the objects utilized to form a scene can be individually encoded in order to exploit the similarities and properties between adjacent time-slices of the objects in order to reduce the bandwidth required to transmit the scene. Further, the ability to individually encode different objects also lends itself to the ability, under the MPEG-4 standard, to individually manipulate different objects of the scene and to add objects or remove objects from the scene.

The system illustrated in FIG. 1 contains source devices 101 and 102, a transmitter 103 including an MPEG-4 encoder 104, a network 105, a receiver 106 including an MPEG-4 decoder 107 and destination devices 108 and 109. Source devices 101 and 102 may be devices providing a stream of video images such as a computer, video camera or a video player. Although two source devices, source devices 101 and 102, are shown in FIG. 1, any number of source devices may provide multi-media signals to transmitter 103. Transmitter 103 combines the signals from source devices 101 and 102 into a single frame represent by digital data. The digital signal is then provided to MPEG-4 encoder 104, which encodes the data into video packets. In some embodiments, a source device, for example a mobile phone with an integrated camera or a PDA, may have an integrated transmitter 103.

Transmitter 103 sends the video packets across network 105 to receiver 106. Network 105 may be a wireless or wired network. As discussed earlier, network 105 might introduce errors to the transmitted signal. Receiver 106, which includes the MPEG-4 decoder 107, receives the transmitted signal including any network-induced errors. The received signal is processed by MPEG-4 decoder 107 and the processed signal subsequently provided to a targeted destination device, which may be one of destination devices 108 or 109.

Figure 2:
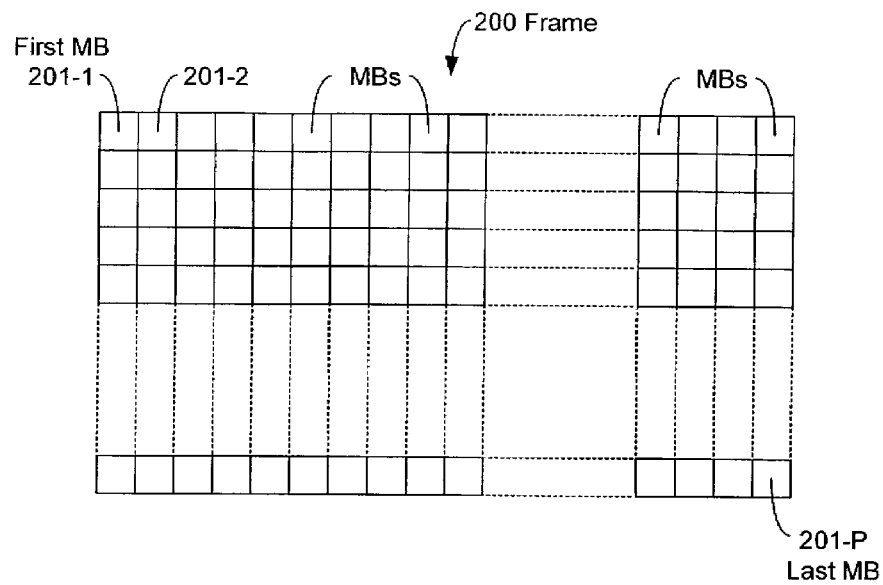
FIG. 2 shows a video frame of data divided into macroblocks of data.
Figure 3:
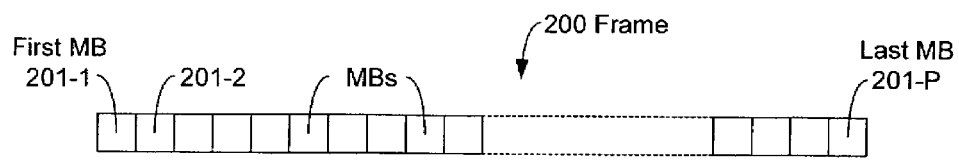
FIG. 3 shows a sequential stream of macroblocks that represent a video frame of data.

FIGS. 2 and 3 show a frame of video data presented in rows and columns and as a sequential series of MBs. Referring to FIG. 2, a frame of video data 200 may be subdivided into a number of macroblocks (MBs) 201-1, 201-2, . . . , 201-P arranged in rows and columns as they would be viewed on a computer monitor. For convenience, FIG. 2 highlights a first MB 201-1 in the top-left portion of the video image and a last MB 201-P in the bottom-right portion of the video image. FIG. 3 shows the MBs 201-1, 201-2, . . . , 201-P of frame 200 sequentially ordered starting with the first MB 201-1 and ending with the last MB 201-P.

Figure 4:
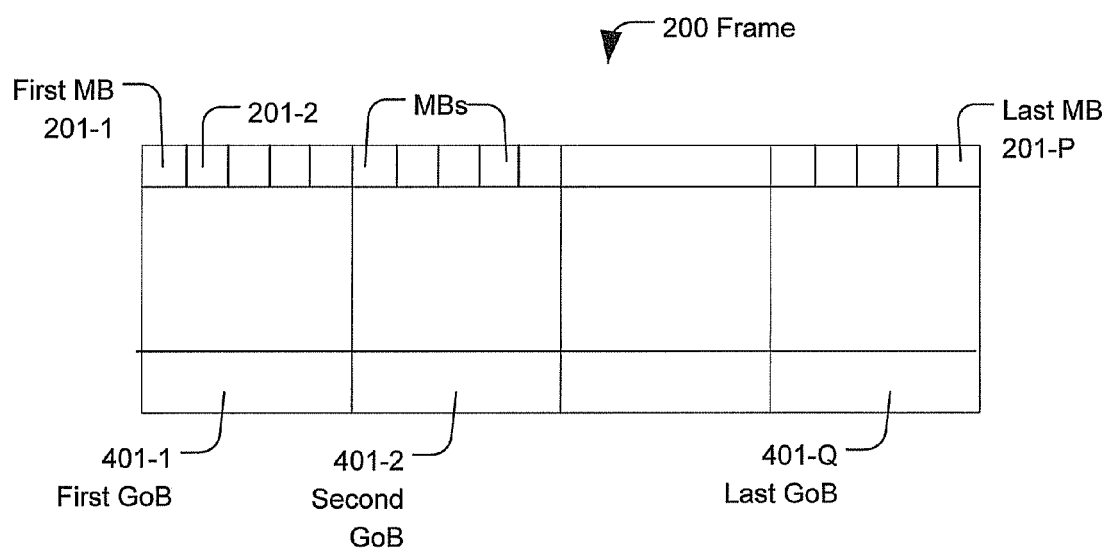
FIG. 4 illustrates the conventional division of a sequential stream of macroblocks into a sequence of equally sized Groups of Blocks.

FIG. 4 illustrates the results of a conventional method of dividing a sequence of MB into groups of blocks. Conventionally, the sequence of MBs representing a video frame is evenly divided into equally sized groups of MBs. The groups, each called a group of blocks, (GoB), contain the same number of MBs and therefore contain the same number of unencoded bits. In the example shown in FIG. 4, each GOB 401-1, 401-2, . . . , 401-Q contains five MBs.

Figure 5:
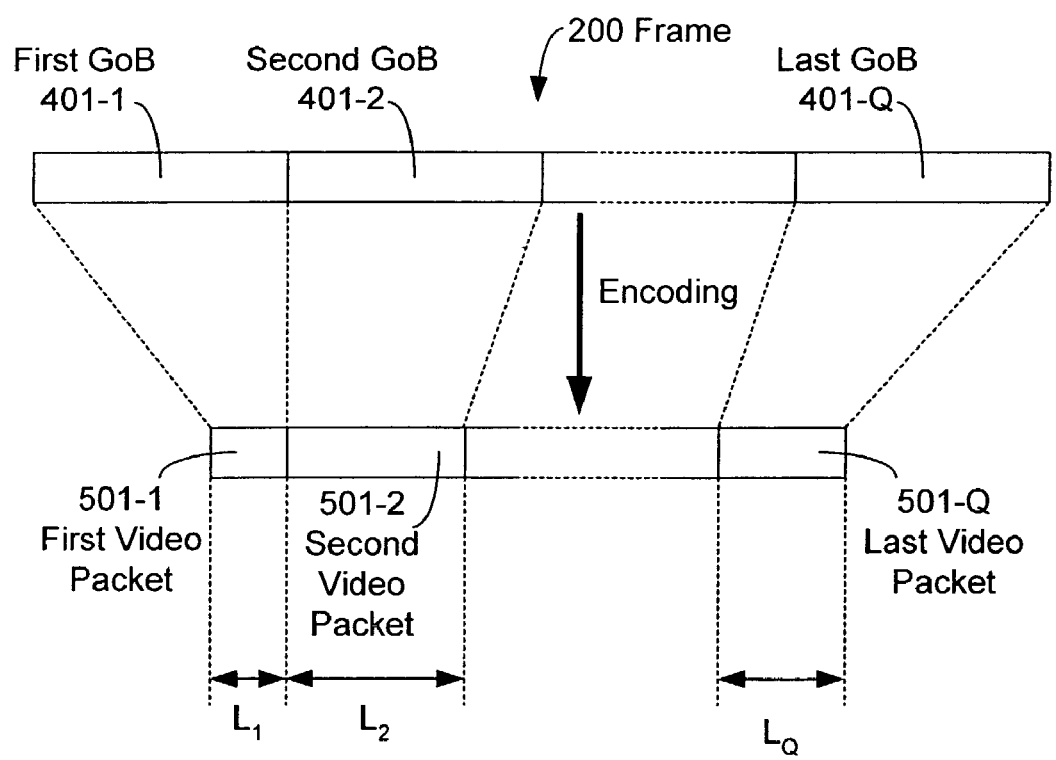
FIG. 5 shows a mapping from equally sized Groups of Blocks to a sequence of video packets.

FIG. 5 shows a mapping from GoBs 401-1, 401-2, . . . , 401-Q to video packets. The equally sized GoBs are encoded by the MPEG-4 encoder 104 into video packets. As shown, the encoded video packets might vary in size by a substantial number of bits. For example, the first video packet 501-1 may contain very little information such that the MPEG-4 encoder compresses the information into just a few bits ($L_1$). The second GoB 501-2 may contain a large amount of complex information resulting in a low compression rate. The second GoB 501-2 is encoded into a very long sequence of bits ($L_2$). Each subsequent GoB is encoded into a respective video packet of varying packet bit-length.

FIG. 10 shows the general format of a video packet 1000. Video packet 1000 includes a resync marker 1001, a macroblock number 1002, a quantum number 1003, an HEC field 1004, encoded macroblock data 1005, and a second resync marker 1006. Resync marker 1001 distinguishes the start of a new video packet and is distinguishable from codes used by a variable length coder or to indicate the start of a video frame. Macroblock number 1002, quantum number 1003, and HEC field 1004 are part of the header for video packet 1000. Macroblock number 1001 provides the spatial resynchronization, e.g. by indicating the position of the first encoded macroblock of data in encoded macroblock data 1005. The quantization number 1003 provides the quantization value of the first macroblock of data and allows the differential decoding process to be resynchronized. The HEC field 1004 indicates whether there is additional information contained in the header. Additional information can include a modulo time base, a VOP time increment value, a VOP coding type, and intra de variable length coding threshold, and VOP forward and backward coding parameters.

The macroblock data is encoded into the encoded macroblock data field 1005. The macroblocks that are compiled to fill the encoded macroblock data field 1005 make up a Group of Macroblocks (GoB). The last macroblock in the GoB is encoded to include a flag to identify that macroblock as the last macroblock in the GoB, and the last macroblock in encoded macroblock data field 1005. Referring back to FIG. 5, the length of macroblock data field 1005 in video packet 501-1 through 501-Q is $L_1$ through $L_Q$, respectively. A second resync field 1006 in FIG. 6 signals the end of video packet 1000.

Typically, the bit error rate due to transmission of data through network 105 is a constant such that errors are equally likely anywhere in the bit sequence. Therefore, on average, the impairments of the channel of network 105 introduce more bit errors into the longer video packets than into the shorter video packets. Conversely, the shorter video packets on average are subject to fewer bit errors after transmission through the channel than the longer video packets. The expected video packet error rate therefore is variable and based in part on the length of the packet. The shorter video packets, however, are less efficient in transferring video information per bit transmitted. Since each packet contains a fixed number of overhead bits, the ratio of overhead bits to video information bits in shorter video packets is higher than in the longer video packets.

To alleviate the increased probability of error in longer video packets, each GoB 401 may be sub-divided into two or more GoBs. The resulting probability of error per packet decreases as a result of having shorter GoBs. The decreased probability of error per packet comes at a cost. By decreasing the number of MBs per GoB, a set number of unencoded bits require a larger number of packets. Optimally, each encoded video packet contains the same number of bits (L).

By encoding each video packet to contain a fixed number of bits (L), the error rate per packet is uniform. The number of bits (L) per packet may be selected based on the expected channel error rate and the robustness of the decoder algorithm. For any given channel having a particular expected error rate, the packet length (L) is properly selected by balancing the reduced loss of video packets by having a low value L and increased channel efficiency by having a high value L.

Once a length (L) is selected, MBs are grouped and encoded until a video packet of approximately length L is formed. Once the video packet contains approximately L bits, subsequent sequences of MBs are similarly grouped and encoded resulting in a series of encoded video packets each containing approximately L bits.

Figure 6:
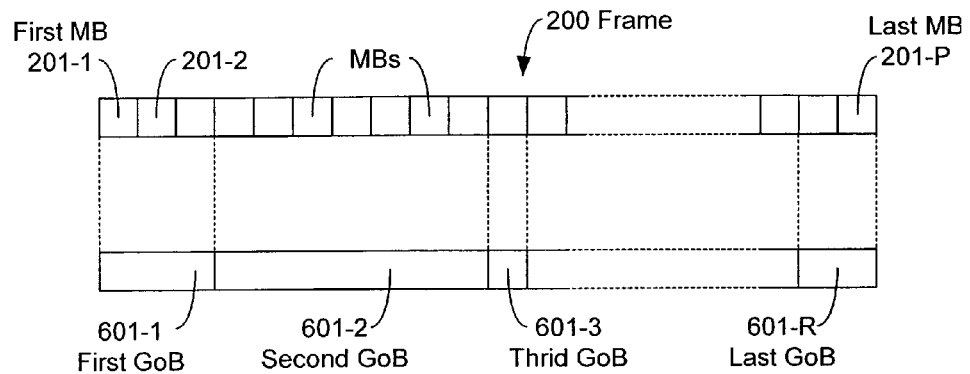
FIG. 6 illustrates a division of a sequential stream of macroblocks into a sequence of Groups of Blocks according to the present invention.

FIG. 6 illustrates a division of a sequential stream of MBs 201-1, 201-2, ..., 201-P of a frame 200 into a sequence of GoBs 601-1, 601-2, ..., 601-R according to the present invention. The division of sequence of MBs is not necessarily a result of evenly sized GoBs. For example, FIG. 6 shows a first GoB 601-1 containing only three MBs, where the second GoB 601-1 contains seven MBs and the third GoB contains just a single MB. The number of MBs per packet depends on the compressibility of the video data within each MB. The number of MBs in any given video packet is selected such that the resulting encoded video packet each contain substantially the same number of bits.

Figure 7:
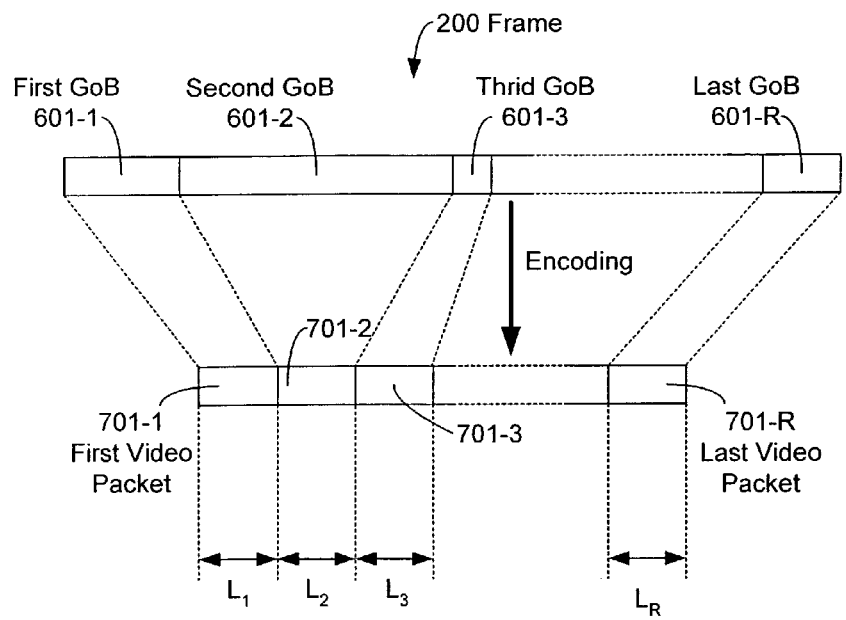
FIG. 7 shows a bit mapping from Groups of Blocks to a sequence of packets having substantially uniform length according to the present invention.

FIG. 7 shows a bit mapping from GoBs 601-1, 601-2, ..., 601-R to a sequence of video packets 701-1, 701-2, ..., 701-R having substantially uniform length (L) according to the present invention. Video packets 701-1, 701-2, ..., 701-R can have the same general format as video packet 1000 discussed with FIG. 10. The MPEG-4 encoder 104 in the transmitter 103 encodes each GoB 601. Encoder 104 encodes the first GoB 601-1 into the first video packet 701-1 resulting in a video packet of approximately length L to be transmitted through channel 105 to receiver 106. Next, encoder 104 encodes a second GoB 601-2 resulting in a second video packet 701-2. As encoder 104 encodes each MB 201 of each GoB 601, the final MB of each GoB is encoded with a flag indicating that it is the final MB of that GoB. The process continues on the sequence of MBs presented to the encoder until a last GoB 601-R of a frame 200 is encoded into a last video packet 701-R.

Using prior knowledge regarding the compressibility of a MB, a system can keep a running total of approximately the number of bits so far assembled into a video packet. Alternatively, a system can use an MPEG-4 encoder to encode and compress the video data to determine the actual bit length contributed to the packet by a particular MB. Based on the approximate or actual bit length of a compressed MB, that MB can be appended to the end of the current video packet or can be used to start a new video packet.

In some embodiments of the present invention, successive MBs are encoded and assembled into video packets such that a video packet continues to grow with the bits of successive encoded MB until the addition of the encoded bits of a current MB puts the running total just over a threshold length (L). The length L acts as a minimum number of bits. If necessary, the current MB is re-encoded as the final MB of the video packet. Alternatively, the encoder determines the probability or likelihood that an MB will be the last MB of a packet. If the encoder determines that it is more likely that the current MB will be the last MB; then the MB may be encoded as the last MB. Only if it turns out that the current MB is not the last MB will re-encoding be necessary.

In some embodiments of the present invention, MBs are encoded and assembled into video packets such that the length of the video packet never increases beyond length L. In these embodiments, if the addition of the bits from a current MB would put the total over the threshold length L, then those bits from the current MB are not included in the video packet of encoded MB bits but, instead, are used to start a new video packet. If necessary, the prior encoded MB is re-encoded as the final MB of the video packet.

Still in other embodiments of the present invention, successive MBs are encoded and assembled into video packets such that once a currently encoded MB puts the length of a video packet over length L, the next MB becomes the final MB of the current video packet. In these embodiments, it is not necessary to re-encode the last MB of the video packet because during the encoding of the final MB, it is known that it will be the final MB of a GoB. In these embodiments, the threshold length L might be set slightly lower than in the previous embodiments because an additional MB is encoded and appended to the end of a video packet once the threshold length L is reached. The resulting deviation of the lengths of video packets from a fixed length is greater; however, the circuitry of encoder 104 becomes less complex to implement.

With each embodiment described, the length of the video packets generated are not necessarily identical. The embodiments create video packets with roughly equal length with variations primarily due to variations in data complexity of the first and/or final encoded MB of each GoB. As a result of creating video packets of roughly equal length, the bit errors per received video packet will also be roughly equal.

FIG. 8 presents a flow chart of an example embodiment of the present invention. The method sequentially processes MBs 201 of a video frame 200 from the first MB 201-1 through to the last MB 201-P of FIG. 3. In step 801, the beginning of a GoB 601 is created including resync bits and header bits. In step 803, the next MB is indexed from the sequentially ordered MBs. Initially, the first MB 201-1 of a frame 200 of MBs is processed. Subsequent executions of step 803 process the next unprocessed MB until the last MB 201-P of a frame 200 is processed.

In step 805, the current MB is encoded. In step 807, the encoded bits of the current MB are appended to the incomplete video packet to be transmitted. In optional step 809, the bits so far accumulated are transmitted over the network to the receiver. If step 809 is not executed, the bits are accumulated for future transmission in step 819. In step 811, the number of encoded bits of the current MB are summed with a running total of bits previously appended to the incomplete video packet. If the new total number of bits so far accumulated in the video packet is not greater than or equal to a set threshold length L, the process begins again with step 803 processing the next MB 201.

In some embodiments, once the threshold length L is achieved, the current MB is re-encoded as the last MB of the GoB. The re-encoded bits replace the bits added to the packet in step 807. The re-encoded bits, rather than the originally encoded bits, are then transmitted.

In other embodiments, if the number of bits so far accumulated in an incomplete video packet is greater than or equal to the set threshold length L, the process completes the video packet by encoding a final MB of the GoB. In step 813, the final MB is retrieved. In step 815, the final MB is encoded with a flag indicating it is the last MB of the video packet. In step 817, the encoded bits of the final MB are added to the video packet to create a complete video packet. In step 819, the bits so far accumulated and not thus transmitted are transmitted over the network to the receiver.

Step 821 ends the GoB with the final MB of the video packet 701. If additional MBs 201 of a frame 200 remain unprocessed, the process shown in FIG. 8 repeats for the next GoB with step 801 through step 821. The process repeats until all MBs 201 of a frame 200 are encoded and appended to video packets 701 and transmitted to the receiver. Once the present frame 200 of video data is processed, subsequent frames of video data are similarly processed.

FIG. 9 shows a block diagram of an example embodiment of the present invention. The discrete cosine transform (DCT) of block 902 accepts MB data 201. Block 902, converts the MB data 201 into a weighted sum of spatial frequency coefficients and provides the resulting DCT coefficients to quantizer block-904. Block 904 quantizes the DCT coefficient data provided by block 902 with a visually-weighted quantization matrix. Next, DC and AC predictor block 906 encodes the quantizied bits, which are optionally saved in a MB buffer block 908. The buffered bits are ordered in a two-dimensional DFT table in increasing horizontal frequency and in increasing vertical frequency. Zigzag and alternate scan block 910 sequentially orders the data such that the more visually important DC and low frequency data precedes the less visually important higher frequency data in order to maximize compressibility. The Variable Length Coder (VLC) block 912 truncates bits of lower importance such as the higher frequency data to an extent necessary as a result of the channel capacity. The number of bits to be transmitted for the current MB are accumulated with the past bits accumulated to the current incomplete video packet. The number of accumulated bits are provided to rate control block 914.

DC&AC predictor 906, zigzag and alternate scan 910, and VLC 912 are further discussed in U.S. application Ser. No. 10/346,736, entitled "Texture Encoding Procedure,", to Yi-Yung Jeng, assigned to the same assignee as is the present application, herein incorporated by reference in its entirety.

The rate control block 914 or equivalent control circuitry may be used to signal the quantizer with the current MB must be quantized (or re-quantized) with an end-of-packet indicator or a not-end-of-packet indicator. In some embodiments, once the number of accumulated bits reaches a threshold length L, the very next MB is treated as the final MB of the GoB and, once encoded, completes the video packet to be transmitted. In other embodiments, if the number of accumulated bits reaches the threshold length L, block 914 or equivalent control circuitry initiates a process that causes quantizer 904 to re-quantize the current MB. Block 914 may provide a Q value to quantizer block 904 that indicates whether the MB to be encoded should be encoded as the final MB of the GoB and video packet.

The above description is for example only. One skilled in the art may find alternate embodiments of the invention which would fall within the spirit and scope of this invention. As such, this invention is limited only by the following claims.

I claim:

1. A method of transmitting video data, the method comprising:
    encoding a first macroblock of video data into a video packet;
    determining whether a length of the video packet including the first macroblock exceeds a threshold length;
    encoding a second macroblock into the video packet as a final macroblock when the length of the video packet with the first macroblock exceeds the threshold length; and
    transmitting the video packet.

2. The method of claim 1, wherein encoding the first macroblock of video data includes performing a discrete cosine transformation and subsequent quantization.

3. The method of claim 1, wherein encoding the first macroblock of video data includes performing a DC and AC predictor encoding.

4. The method of claim 1, wherein determining whether the length of the video packet including the first macroblock exceeds the threshold length comprises estimating a length of the video packet.

5. The method of claim 4, wherein the length of the video packet is estimated based at least partially on a number of macroblocks included in the video packet.

6. The method of claim 1, wherein determining whether the length of the video packet including the first macroblock exceeds the threshold length comprises calculating an actual bit length of the video packet.

7. The method of claim 1, further comprising:
    encoding the second macroblock as the final macroblock after determining that the length of the video packet including the first macroblock exceeds the threshold length; and
    adding the final macroblock to the video packet.

8. The method of claim 1, wherein the first macroblock is not recoded when the length of the video packet with the first macroblock exceeds the threshold length.

9. A video data encoder, comprising:
a discrete cosine transform that receives macroblocks of video data and outputs transformation data;
a quantizer that quantizes the transformation data;
an encoder that encodes the quantized transformation data; and
a variable length coder that arranges the quantized transformation data by groups of macroblocks into video packets by adding blocks of quantized transformation data to a video packet until a length of the video packet exceeds a first threshold length, and adding a next block of quantized transformation data after the length of the video packet exceeds the first threshold length.

10. The video data encoder of claim 9, wherein the variable length coder adds the next block of quantized transformation data to the video packet when a predicted length of the video packet including the next block of quantized transformation data does not exceed a second threshold length.

11. The video data encoder of claim 10, wherein the variable length coder re-encodes a previous block of quantized transformation data as the final block when addition of the next block of quantized transformation data would result in the length of the video packet exceeding the second threshold length.

12. The video data encoder of claim 9, wherein the variable length coder does not re-encode a previous block of quantized transformation data as the final block.

* * * * *